(12) United States Patent
Lim

(10) Patent No.: US 8,087,039 B2
(45) Date of Patent: Dec. 27, 2011

(54) SPINDLE MOTOR

(75) Inventor: Seong Mo Lim, Seocho-gu (KR)

(73) Assignee: LG Innotek Co., Ltd., Seoul (KR)

( * ) Notice: Subject to any disclaimer, the term of this patent is extended or adjusted under 35 U.S.C. 154(b) by 648 days.

(21) Appl. No.: 12/233,146

(22) Filed: Sep. 18, 2008

(65) Prior Publication Data
US 2009/0077575 A1  Mar. 19, 2009

(30) Foreign Application Priority Data
Sep. 18, 2007  (KR) .................. 10-2007-0094716

(51) Int. Cl.
*G11B 17/028* (2006.01)
(52) U.S. Cl. .......................................... 720/700
(58) Field of Classification Search .............. None
See application file for complete search history.

(56) References Cited

U.S. PATENT DOCUMENTS

| 5,357,163 | A  | * | 10/1994 | Minakuchi et al. | 310/90 |
| 7,915,774 | B2 | * | 3/2011 | Lee | 310/90 |
| 2009/0072646 | A1 | * | 3/2009 | Lee | 310/156.12 |

* cited by examiner

*Primary Examiner* — Mark Blouin
(74) *Attorney, Agent, or Firm* — Saliwanchik, Lloyd & Eisenschenk

(57) ABSTRACT

A spindle motor is provided. The spindle motor includes a base, a bearing housing, a bearing, a rotation shaft, a stator, and a rotor. The bearing housing is installed on the base. The bearing is press-fitted in the bearing housing, and includes a suction magnet installed therein. The rotation shaft is rotatably supported by the bearing, and is drawn by the suction magnet. The stator is supported by the base. The rotor is coupled to the rotation shaft to be rotated through interaction with the stator.

18 Claims, 4 Drawing Sheets

SPINDLE MOTOR

CROSS-REFERENCE TO RELATED APPLICATION

The present application claims the benefit under 35 U.S.C. §119 of Korean Patent Application No. 10-2007-0094716, filed Sep. 18, 2007, which is hereby incorporated by reference in its entirety.

BACKGROUND

The present embodiments relate to a spindle motor.

A spindle motor is installed inside an optical disk drive (ODD), and performs the function of rotating a disk to enable an optical pickup to read data recorded on the disk.

FIG. 1 is a plan view showing a rotation shaft supported on a bearing in a spindle motor according to the related art.

Referring to FIG. 1, a rotation shaft 15 is installed to be supported and capable of rotating in a bearing 11 press-fitted and fixed in a bearing housing (not shown).

The rotation shaft 15 is coupled to a rotor (not shown), and the rotor is rotated (together with the rotation shaft 15) through interaction between a stator (not shown) and the rotor. Here, the rotation shaft 15 simultaneously rotates and orbits along the inner periphery of the bearing 11, by means of a clearance existing between the outer periphery of the rotation shaft 15 and the inner periphery of the bearing 11.

That is, the rotation shaft 15 rotates about a central axis of the rotation shaft 15, and simultaneously orbits about a center of the bearing 11.

When the rotation shaft 15 orbits about the center of the bearing 11, rotational eccentricity increases in a radial direction to the rotation shaft 15. Thus, in a related art spindle motor, the surface vibration in an axial direction of a disk mounted on the rotor that is coupled to the rotation shaft 15, or the upward and downward surface vibration, becomes severe and reduces product reliability.

In particular, when the disk is rotated at low speeds, the surface vibration in the axial direction of the disk increases, so that when a predetermined design is printed on the surface of the disk, lines to be represented overlap or are not accurately represented.

BRIEF SUMMARY

Embodiments provide a spindle motor.

Embodiments also provide a spindle motor capable of reducing rotational eccentricity in a radial direction of a rotation shaft.

Embodiments further provide a spindle motor capable of reducing surface vibration in an axial direction of a disk.

In one embodiment, a spindle motor includes: a base; a bearing housing installed on the base; a bearing installed in the bearing housing, and including a suction magnet installed therein; a rotation shaft rotatably supported by the bearing, and drawn by the biased pulling force of the suction magnet; a stator supported by the base; and a rotor coupled to the rotation shaft to be rotated through interaction with the stator.

In another embodiment, a spindle motor includes: a base; a bearing housing installed on the base; a bearing installed in the bearing housing, and including a first suction magnet installed on an upper portion thereof and a second suction magnet installed on a lower portion thereof; a rotation shaft rotatably supported by the bearing, and drawn by the biased pulling force of the first suction magnet and the second suction magnet; a stator supported by the base; and a rotor coupled to the rotation shaft to be rotated through interaction with the stator.

In a further embodiment, a bearing, for a spindle motor to rotatably support a rotation shaft, includes a suction magnet installed thereon to attract the rotation shaft.

The details of one or more embodiments are set forth in the accompanying drawings and the description below. Other features will be apparent from the description and drawings, and from the claims.

DETAILED DESCRIPTION

Reference will now be made in detail to a spindle motor according to an embodiment of the present invention, examples of which are illustrated in the accompanying drawings.

Figure 1:
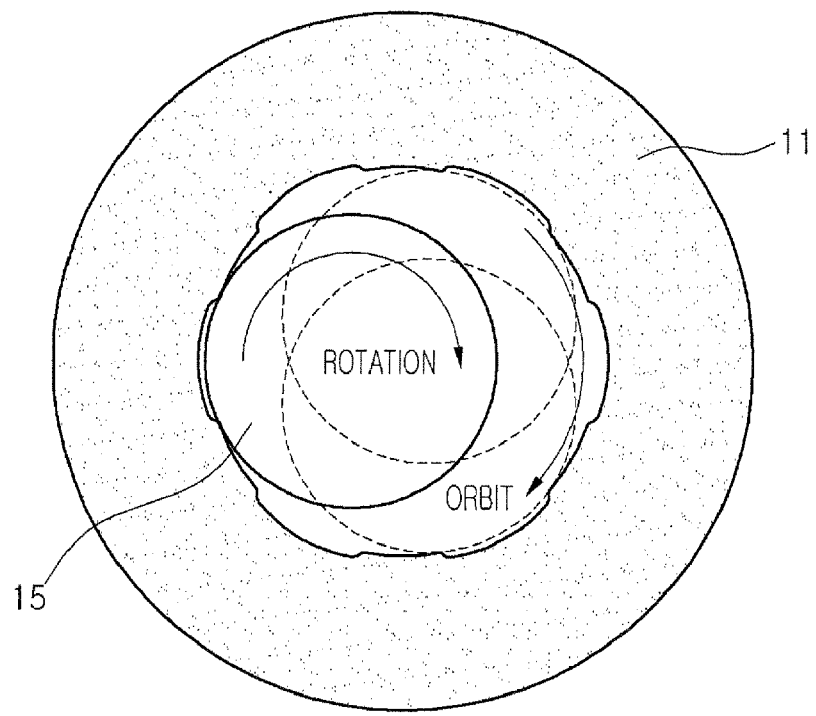
FIG. 1 is a plan view showing a rotation shaft supported on a bearing while rotating in a spindle motor according to the related art.
Figure 2:
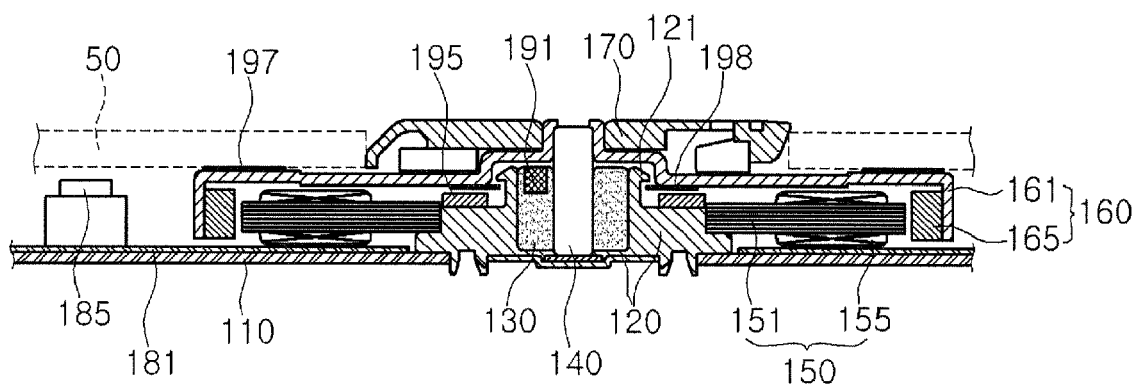
FIG. 2 is a sectional view of a spindle motor according to a first embodiment of the present invention.
Figure 3:
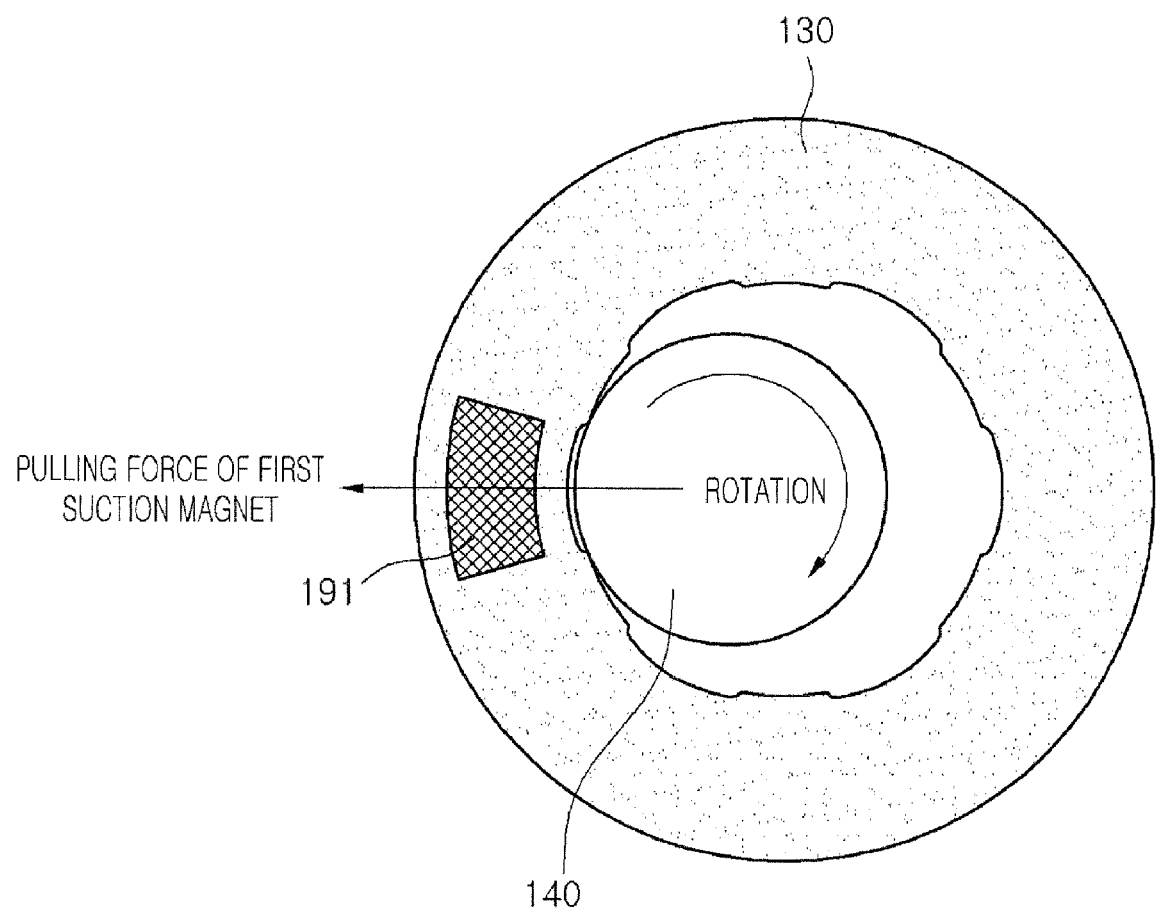
FIG. 3 is a plan view showing a rotation shaft supported on a bearing while rotating in a spindle motor according to the first embodiment of the present invention.

FIG. 2 is a sectional view of a spindle motor according to a first embodiment of the present invention, and FIG. 3 is a plan view showing a rotation shaft supported on a bearing while rotating in a spindle motor according to the first embodiment of the present invention.

Referring to FIGS. 2 and 3, a bearing housing 120 is installed upright on a base 110. A bearing 130 is press-fitted and fixed in the bearing housing 120, and a lower end of a rotation shaft 140 that is magnetic is installed to be supported by the bearing 130 to be capable of rotating.

A stator 150, having a core 151 and a coil 155 wound on the core 151, is fixed to the outer periphery of the bearing housing 120, and a rotor 160, having a rotor yoke 161 and a magnet 165 coupled to the inner periphery of the rotor yoke 161, is installed on the outer periphery of the rotation shaft 140 exposed above the bearing housing 120.

When a current is supplied to the coil 155 in the above spindle motor, the rotor 160 rotates by means of interaction between the stator 150 and the rotor 160, to rotate together with the rotation shaft 140. Also, when a disk 50 is mounted on the rotor yoke 161, the disk 50 is rotated according to the rotation of the rotor yoke 161.

A clamp 170 is coupled to the rotor yoke 161 that is coupled to the rotation shaft 140, and the clamp 170 elastically supports the disk 50 to align the center of the disk 50 mounted on the rotor yoke 161 with the center of the rotation shaft 140.

A surface of the base 110 facing the rotor yoke 161 has a substrate 181 installed thereon, and an encoder 185 is installed on the substrate 181. When a laser prints a design on the surface of the disk 50, the encoder 185 detects the rotating speed of the disk 50.

A clearance exists between the inner periphery of the bearing 130 and the outer periphery of the rotation shaft 140. Thus, the rotation shaft 140 rotates and also orbits along the inner periphery of the bearing 130 while contacting the inner periphery of the bearing 130. When the rotation shaft 140 orbits, rotational eccentricity in a radial direction of the rotation shaft 140 increases to induce surface vibration in an axial direction of the disk 50.

In a spindle motor according to the first embodiment of the present invention, orbiting of the rotation shaft 140 is prevented to reduce the surface vibration in a radial direction of the rotation shaft 140.

The bearing 130 has a first suction magnet 191 formed thereon to attract the rotation shaft 140 with biased pulling force of the first suction magnet 191.

Referring to FIG. 2, the first suction magnet 191 is formed integrally with an inner side of the bearing 130 to draw the rotation shaft 140 toward a side of the bearing 130.

For example, the first suction magnet 191 may be formed within the bearing 130, or may be formed atop the bearing 130. The first suction magnet 191 may be formed such that at least a portion is inserted in the bearing 130.

When the bearing 130 is viewed from the side, the first suction magnet 191 may be formed to project upward and be disposed eccentrically from the vertical center of the bearing 130.

Accordingly, as shown in FIG. 3, the first suction magnet 191 enables the rotation shaft 140 to rotate while contacting an inner side of the bearing 130.

Thus, rotational eccentricity in a radial direction of the rotation shaft 140 is negated, so that surface vibration of a disk 50 mounted on the rotor yoke 161 fixed to and rotating with the rotation shaft 140 can be reduced.

An annular third suction magnet 195 is installed on the bearing housing 120 or the core 151. The third suction magnet 195 prevents rising of the rotor 160 by attracting the rotor 160. While in FIG. 2, the third suction magnet 195 is shown installed atop the bearing housing 120, the third suction magnet 195 may selectively be installed on the core 151 and the bearing housing 120.

The bearing housing 120 has a protruding portion 121 formed extending from the top thereof outward in a radial direction, and the rotor yoke 161 has a stopper 198 installed at the bottom surface thereof that partially overlaps with the protruding portion 121 in a vertical direction.

When the rotor yoke 161 begins to rise, the stopper 198 catches on the protruding portion 121 of the rotor yoke 161 to prevent the rotor yoke 161 from disengaging from the rotation shaft 140.

A felt 197 may be formed on the upper surface of the rotor yoke 161. The felt 197 increases friction on the contacting surface of the disk 50 to prevent slippage of the disk 50 from rotational inertia.

Figure 4:
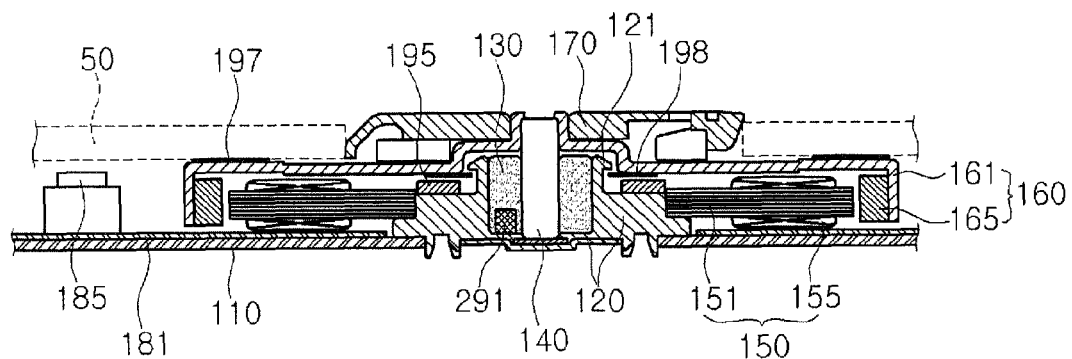
FIG. 4 is a plan view of a spindle motor according to a second embodiment of the present invention.

FIG. 4 is a plan view of a spindle motor according to a second embodiment of the present invention, and descriptions already given with reference to FIG. 2 will not be provided again.

Referring to FIG. 4, a second suction magnet 291 is integrally formed on one side within the bearing 130 to draw the rotation shaft 140 toward one side of the bearing 130.

The second suction magnet 291 may be formed at the lower portion of the bearing 130. The second suction magnet 291 may be formed such that at least a portion thereof is inserted into the bearing 130.

When the bearing 130 is viewed from the side, the second suction magnet 291 may be formed to be disposed biased downward from the vertical center of the bearing 130.

Figure 5:
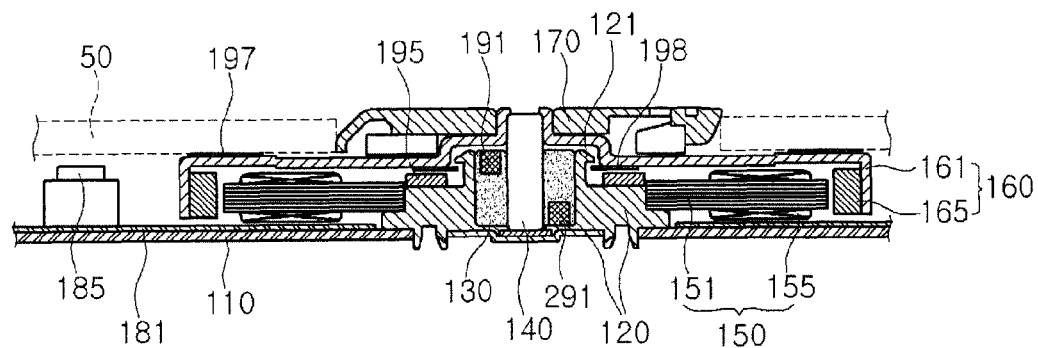
FIG. 5 is a plan view of a spindle motor according to a third embodiment of the present invention.
Figure 6:
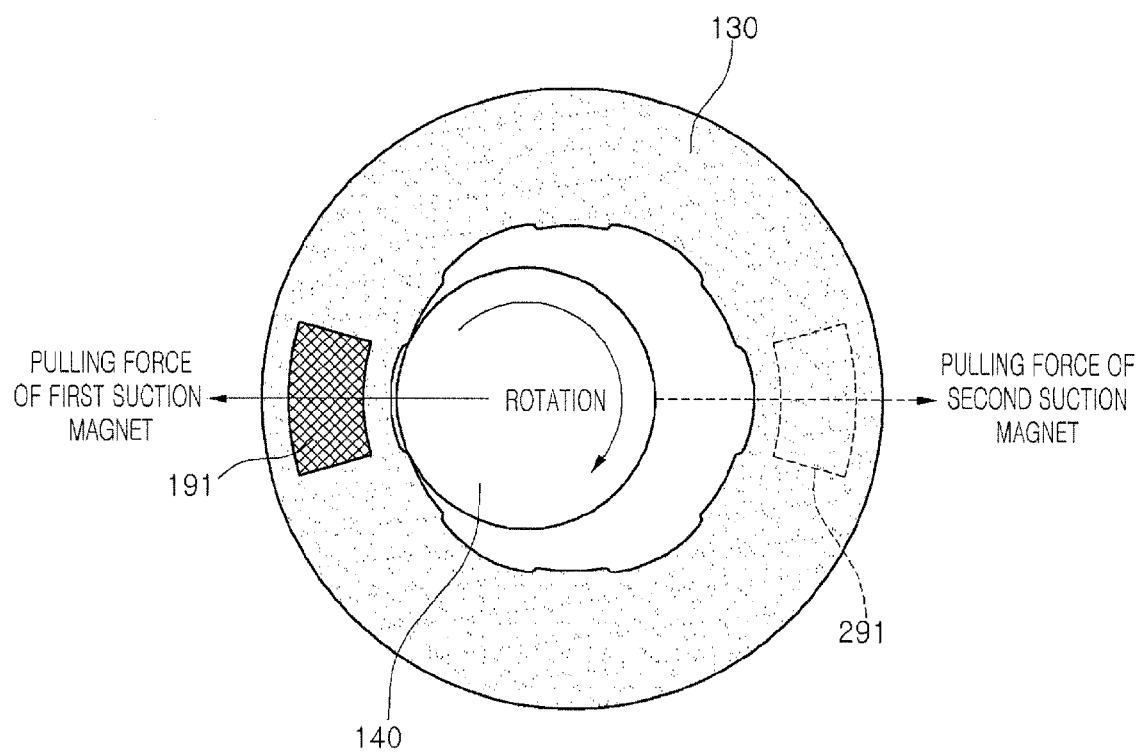
FIG. 6 is a plan view of a spindle motor according to the third embodiment of the present invention.

FIG. 5 is a plan view of a spindle motor according to a third embodiment of the present invention, and FIG. 6 is a plan view of a spindle motor according to the third embodiment of the present invention.

Referring to FIGS. 5 and 6, the first suction magnet 191 and the second suction magnet 291 are integrally formed to one side within the bearing 130 to draw the rotation shaft 140 toward one side of the bearing 130 with the biased pulling force.

The first suction magnet 191 may be formed on the upper portion of the bearing 130, and the second suction magnet 291 may be formed on the lower portion of the bearing 130.

The first suction magnet 191 and the second suction magnet 291 may be formed to respectively have a portion inserted in the bearing 130. For example, they may be formed to be biased upward and downward from the vertical center of the bearing 130.

Referring to FIG. 6, when viewing the bearing 130 from above, the first suction magnet 191 and the second suction magnet 291 may be disposed facing one another about the horizontal center of the bearing 130.

Because the first suction magnet 191 is disposed on the upper portion of the bearing 130, and the second suction magnet 291 is disposed on the lower portion of the bearing 130, the first suction magnet 191 is depicted with unbroken lines, and the second suction magnet 291 is depicted with broken lines.

That is, the first suction magnet 191 attracts the rotation shaft 140 from an upper portion in a first direction, and the second suction magnet 291 attracts the rotation shaft 140 from a lower portion in a second direction opposite to the first direction.

As described above, in a spindle motor according to the present invention, the first and second suction magnets 191 and 291 attract the rotation shaft 140 toward one side of the bearing, respectively.

Accordingly, the rotation shaft 140 rotates while contacting an inner side of the bearing 130 to negate rotational eccentricity of the rotation shaft 140 in a radial direction from the rotation shaft 140 orbiting. Thus, surface vibration of a disk 50 mounted on the rotor yoke 161 that is rotated by the rotation shaft 140 is reduced.

By reducing the surface vibration of the disk 50, a desired design can be accurately printed on the surface of the disk 50.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
a base;
a bearing housing installed on the base;
a bearing installed in the bearing housing, and comprising a suction magnet installed in a biased position of the bearing;
a rotation shaft rotatably supported by the bearing, and drawn by the suction magnet;
a stator supported by the base; and
a rotor coupled to the rotation shaft to be rotated through interaction with the stator,
wherein the bearing housing comprises a protruding portion projecting radially outward from an upper portion of the bearing housing, and the rotor comprises a stopper installed on a lower surface thereof, the stopper having a portion vertically overlapping the protruding portion.

2. The spindle motor according to claim 1, wherein the suction magnet has at least a portion inserted in the bearing.

3. The spindle motor according to claim 1, wherein the suction magnet is installed on an upper portion of the bearing.

4. The spindle motor according to claim 1, wherein the suction magnet is installed on a lower portion of the bearing.

5. The spindle motor according to claim 1, wherein, when the bearing is viewed from a side, the suction magnet is installed in a position biased upward or downward from a vertical center of the bearing.

6. A spindle motor comprising:
a base;
a bearing housing installed on the base;
a bearing installed in the bearing housing, and comprising a first suction magnet installed in a biased position of an upper portion of the bearing and a second suction magnet installed in a biased position of a lower portion of the bearing;
a rotation shaft rotatably supported by the bearing, and drawn by the first suction magnet and the second suction magnet;
a stator supported by the base; and
a rotor coupled to the rotation shaft to be rotated through interaction with the stator.

7. The spindle motor according to claim 6, wherein the first suction magnet or the second suction magnet has at least a portion inserted in the bearing.

8. The spindle motor according to claim 6, wherein when the bearing is viewed from above, the first suction magnet and the second suction magnet are disposed facing one another about a horizontal center of the bearing.

9. The spindle motor according to claim 6, wherein the first suction magnet draws the rotation shaft in a first direction from the upper portion, and the second suction magnet draws the rotation shaft in a second direction that is opposite the first direction from the lower portion.

10. The spindle motor according to claim 6, wherein the bearing housing comprises a protruding portion projecting radially outward from an upper portion of the bearing housing, and the rotor comprises a stopper installed on a lower surface thereof, the stopper having a portion vertically overlapping the protruding portion.

11. The spindle motor according to claim 6, further comprising a third suction magnet installed on the bearing housing or the stator to draw the rotor.

12. The spindle motor according to claim 6, wherein the rotor comprises a clamp coupled thereto to elastically support a disk that is mounted.

13. A bearing for a spindle motor to rotatably support a rotation shaft, the bearing comprising a suction magnet installed thereon to attract the rotation shaft.

14. The bearing according to claim 13, wherein the suction magnet has at least one portion thereof inserted and installed in the bearing.

15. The bearing according to claim 14, wherein the suction magnet is installed to be biased to one side from a center of the bearing.

16. The bearing according to claim 15, wherein the suction magnet is installed on at least one of an upper portion and a lower portion of the bearing.

17. The bearing according to claim 15, wherein the suction magnet comprises a first suction magnet and a second suction magnet installed on two portions of the bearing, respectively.

18. The bearing according to claim 17, wherein the first suction magnet draws the rotation shaft in a first direction, and the second suction magnet draws the rotation shaft in a second direction opposite the first direction.

* * * * *